Figure 1:
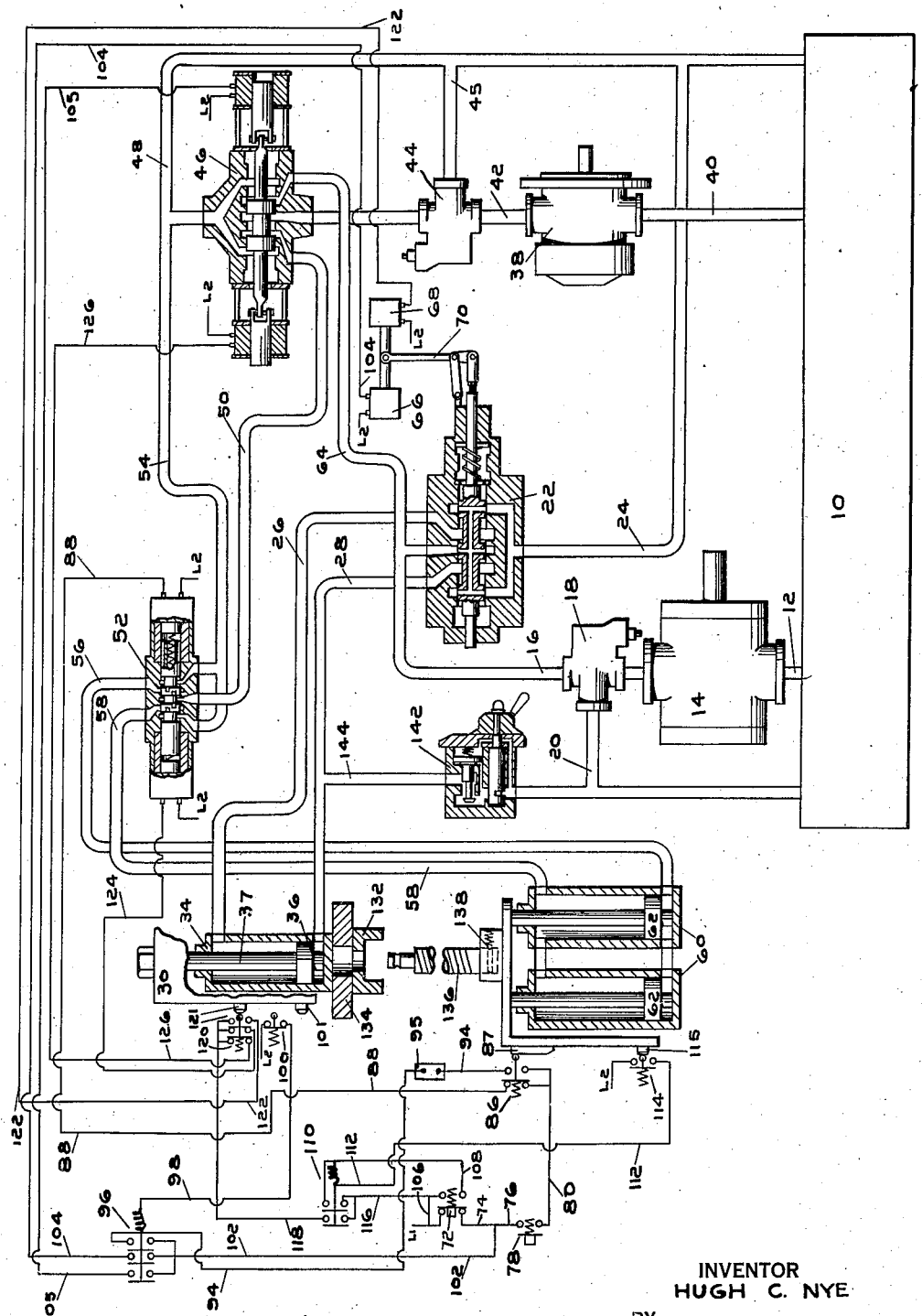

Nov. 21, 1939.  H. C. NYE  2,180,817

POWER TRANSMISSION

Filed Feb. 23, 1938

INVENTOR
HUGH C. NYE
BY
*Ralph L. Tweedale*
ATTORNEY

Patented Nov. 21, 1939

2,180,817

UNITED STATES PATENT OFFICE 2,180,817

POWER TRANSMISSION

Hugh C. Nye, Detroit, Mich., assignor to Vickers Incorporated, Detroit, Mich., a corporation of Michigan Application February 23, 1938, Serial No. 192,029

8 Claims. (Cl. 90—33)

This invention relates to power transmissions and more particularly to those of the fluid type wherein a power transmitting fluid, such as oil, and hereinafter referred to as such, is utilized for the transmission of power between one or more pumps and one or more fluid motors.

This invention is concerned with a power transmission system particularly adapted for operating a plurality of hydraulic motors in predetermined sequence and may be used, for example, on a hydraulically operated broaching machine. Machines of this character are provided with a main ram to which a pull broach may be detachably secured after the pilot end of the broach tool has been inserted through a hole in a work piece. The ram operates to pull the broach completely through the hole forming it to correct size and shape as is well known in the art. It is customary to also provide means for handling the broach tool while a finished work piece is removed from the machine and a fresh work piece is inserted. Machines of this character have been provided heretofore with hydraulic tool handling cylinders for this purpose. In certain classes of work where large amounts of stock are to be removed in a single pass the broach tool is very long and the free end thereof has a tendency to whip as it is pulled through the hole causing chattering and inaccurate work.

It is an object of the present invention to provide a power transmission system suitable for operating a broaching machine and wherein means are provided both for automatically handling the broaching tool while it is disconnected from the main slide and also for positively holding the free end of the tool against whip throughout a major portion of its working stroke.

It is also an object of the present invention to provide a power transmission system for operating a broaching machine of this character wherein the broach handling cylinder may be operated through a sufficiently long stroke to completely clear a work piece having a deep recess without unnecessary increase in the time required for thus moving the broach idly.

Further objects and advantages of the present invention will be apparent from the following description, reference being had to the accompanying drawing wherein a preferred form of the present invention is clearly shown.

In the drawing:

The single figure represents a diagrammatic view of a power transmission system embodying a preferred form of the present invention.

A tank 10 contains a supply of oil which may be withdrawn through a suction conduit 12 by a pump 14. The pump 14 has a discharge conduit 16 in which the customary relief valve 18 is inserted for directing oil to the tank through a by-pass conduit 20 whenever a predetermined pressure is exceeded in the conduit 16. The conduit 16 leads to the pressure port of a conventional spring centered open center four-way valve 22, which has its tank port connected to tank by a conduit 24. The cylinder ports of the valve 22 connect by conduits 26 and 28, with the rod and head ends, respectively, of a stationary cylinder 34. The latter has reciprocably mounted therein a piston 36, the rod 37 of which is secured to a vertically movable main slide 30. The slide 30 may be mounted in suitable ways in a broaching machine and is adapted to carry a tool receiving clutch not shown for detachably engaging the pilot end of a broaching tool.

A pump 38 has a suction conduit 40 and a delivery conduit 42 in which is inserted a relief valve 44 for by-passing oil to the tank through a conduit 45. The conduit 42 extends to the pressure port of a solenoid operated, closed center, four-way valve 46, which has its tank port connected to tank by a conduit 48. The left hand cylinder port of valve 46 connects by a conduit 50 which the pressure port of a solenoid operated, spring centered, open center, four-way valve 52, having its tank ports connected by a conduit 54 with the tank conduit 48. The cylinder ports of the valve 52 are connected by conduits 56 and 58 with the head and rod ends, respectively, of a pair of stationary cylinders 60, which are connected in parallel. The cylinders 60 carry pistons 62 reciprocably mounted therein. A conduit 64 branches off from the delivery conduit 16 and connects to the right hand cylinder port of valve 46.

For the purpose of controlling the solenoids at valves 46 and 52, as well as a pair of solenoids 66 and 68, which are connected to the operating lever 70 of the valve 22, an electrical control circuit is provided as follows: A double throw push button switch 72 normally establishes contact from one side of a suitable power line L1 by conductors 74 and 76 to a single throw push button switch 78, which, in its normal position, connects conductor 76 to a conductor 80. The conductor 80 leads to both sides of a double throw limit switch 86 adapted to be shifted by a cam 87 when the pistons 62 have moved up a predetermined distance. The limit switch 86 connects by a conductor 88 with the right hand solenoid of the valve 52. All of the solenoids have their opposite sides connected to line L2. The limit switch 86, when shifted connects conductor 80 to a conductor 94 which extends through a safety switch 95 to the operating coil of a holding relay 96 and thence by a conductor 98 through a normally closed limit switch 100 to the line L2. Limit switch 100 is adapted to be opened by a cam 101 whenever piston 36 reaches the top of its stroke. The holding circuit for the relay 96 as well as the controlled circuits thereof connect with L1 through switch 72, conductor 74 and a conductor 102. One controlled circuit extends from the relay 96 by a conductor 104 to the solenoid 66 of the valve 22. The other controlled circuit extends by a conductor 105 to the right hand solenoid of valve 46.

The normally open contacts of the switch 72 are adapted to establish a circuit from line L1 by a conductor 106 to a conductor 108, leading to the operating coil of a holding relay 110. The other side of the operating coil connects by a conductor 112 with the contacts of a normally closed limit switch 114 and thence to line L2. The limit switch 114 is adapted to be shifted by a cam 115 whenever the pistons 62 start upwardly. The holding circuit for the relay 110 extends by a conductor 116 and conductor 106 directly to the line L1. The controlled circuit of the relay 110 extends from the conductor 116 by a conductor 118 to all circuits of a three circuit limit switch 120. The latter is adapted to be shifted by a cam 121 whenever the piston 36 is at the bottom of its stroke. The normally closed circuit of the switch 120 extends by a conductor 122 to the solenoid 68 of valve 22. The two normally open circuits of the limit switch 120 extend by conductors 124 and 126 to the left hand solenoids of the valves 52 and 46.

In operation with the pumps 14 and 38 running, oil delivered by the pump 14 through conduit 16 is by-passed to tank through the valve 22, which is normally spring centered, and through conduit 24. With the valve 46 in its left hand position, as shown, the delivery of pump 38 is by-passed to tank through conduit 42, valve 46, conduit 50, valve 52 and conduit 54. Under these conditions the system remains at rest. When starting button 78 is depressed a circuit is established from the line L1 through the switch 72, conductors 74 and 76, switch 78, conductor 80, limit switch 86 and conductor 88, to the right hand solenoid of the valve 52. Valve 52 shifts to the right to connect the conduit 50 with the conduit 56 thus admitting pressure oil from the pump 38 to the lower end of the cylinders 60. The pistons 62, accordingly, move upwardly discharging oil from the upper ends of cylinders 60 through conduit 58, valve 52 and conduits 54 and 48 to the tank.

Previous to depressing the starting button 78 a work piece such as 132 may have been positioned beneath the work holding abutment 134 so that, as the pistons 62 move upwardly the broaching tool 136, which is removably secured in a socket 138 carried by the pistons 62 is inserted through the holes in the work piece 132 and abutment 134 and engaged in the tool clutch, carried by the slide 30. This movement is but a small part of the total stroke of the piston 62. As the tool 136 reaches a position in which it becomes locked in the tool clutch in the well known manner, cam 87 rides off limit switch 86. With the operator still holding the starting button depressed, a circuit is established from L1 through switch 72, conductors 74, and 76, switch 78, conductor 80, limit switch 86, conductor 94, operating coil of relay 96, conductor 98, limit switch 100 and line L2. Relay 96, accordingly, closes, establishing its own holding circuit and also closing the circuit from switch 72 by conductors 74 and 102 to conductor 104 and solenoid 66, as well as the circuit through 105 to the right hand solenoid of valve 46.

Valve 22, accordingly, shifts to the right, connecting the pressure port to the left hand cylinder port and causing a flow of oil from pump 14 through conduit 16, valve 22 and conduit 28 to the head end of cylinder 34. At the time that cam 87 rode off from limit switch 86, the latter also opened the circuit through conductor 88 to the right hand solenoid of valve 52. Valve 52 accordingly spring centers while valve 46 moves to its right hand position due to energization of the circuit 105. The delivery of pump 38 is thus joined to the delivery of pump 14 through conduit 42, valve 46, conduit 64 and valve 22. In its center position, valve 52 also connects conduits 56 and 58 together, thus by-passing the two ends of the cylinders 60, permitting the pistons 62 to be pulled upwardly by the slide 30 acting through the tool 136. The tool 136 is thus pulled through the work piece until the pistons 62 reach the end of their upward stroke with the clutch 138 just below the work piece 132. Continued upward movement of the slide 30 pulls the tool 136 out of the clutch 138 and on through the work piece 132 until the lower end of the tool is above the bottom surface of the abutment 134. At this point the cam 101 contacts the limit switch 100, opening the holding circuit 98—102 for relay 96, which accordingly, opens circuits 104 and 105 for the solenoid 66 and the right hand solenoid of valve 46. The valve 22 is accordingly permitted to spring center thus by-passing the delivery of pump 14 to the tank as before and by-passing pump 38 through conduit 42, valve 46 and conduit 64 to valve 22 and tank. The system thus comes to rest with both pistons 62 and cylinder 34 in their uppermost positions.

At this time, the finished work piece may be removed or permitted to fall from its working position and the reverse button 72 may then be depressed. A circuit is thus established from line L1 through conductor 106, switch 72, conductor 108, operating coil of relay 110, conductor 112 and limit switch 114, which is now in its normal position, to line L2. The relay 110, accordingly, closes, establishing its own holding circuit and establishing a circuit from line L1 by conductors 106 and 116, conductor 118, limit switch 120, which is now in its normal position, and conductor 122 to solenoid 68. Valve 22 is accordingly moved to the left to connect the delivery of pumps 14 and 38 with conduit 26 thus admitting oil to the rod end of cylinder 34, causing the piston 36 to move downwardly. As soon as the tool 136 has been moved down sufficiently to engage the clutch 138, the pistons 62 are pushed downwardly for the rest of the stroke of the cylinder 34. Valve 52 remains spring centered, by-passing the cylinders 60 for this purpose. As the piston 36 reaches its lowermost position, cam 121 depresses limit switch 120, thus breaking the circuit to solenoid 68, permitting valve 22 to spring center and by-pass pump 14, and establishing two new circuits extending from L1 by conductors 106, 116, relay 110, conductor 118, switch 120, conductors 124, and 126 to the left hand solenoids of valves 52 and 46. These valves move to the left connecting the delivery of pump 38 to the rod end of cylinders 60, through conduits 50 and 58, thus admitting pressure oil to move the pistons 62 farther down. The tool clutch at slide 30 having been released by suitable mechanism at the bottom of the stroke of piston 36, the tool 36 is carried downwardly to the starting position shown. As the pistons 62 reach this position, cam 115 contacts limit switch 114 thus opening the holding circuit 112—116 of relay 110 which opens to deenergize the left hand solenoids of valves 46 and 52. The latter spring centers, and since the former remains in its left hand position, as shown, the pump 38 is by-passed, through valve 52. The system, accordingly, comes to rest and a new work piece may be placed in working position and the same cycles of operation repeated.

For the purpose of controlling the rate of travel of piston 36 on its upward stroke, a suitable flow control valve, indicated at 142, may be connected by a conduit 144 to the conduit 28. Such a valve may serve in the manner well known in the art to by-pass the proper amount of oil required to maintain a constant rate of flow through the conduit 28 under all variations of resistance encountered in pulling the tool through the work. The safety switch 95 may be connected to be operated by the tool clutch on the slide 30 in a suitable manner so as to remain open if the tool should for any reason not properly engage in the clutch.

While the form of embodiment of the invention as herein disclosed, constitutes a preferred form, it is to be understood that other forms might be adopted, all coming within the scope of the claims which follow.

What is claimed is as follows:

1. In a hydraulic power transmission system the combination of a main fluid motor and an auxiliary fluid motor, said motors being movable through forward and reverse strokes in the same directions, pump means forming a source of fluid under pressure for operating said motors, means for controlling the supply of fluid to said motors, means forming a separable mechanical connection between said motors, and a control circuit for operating the control means to cause said motors to move through a cycle of non-simultaneous but concurrent forward and reverse strokes, the main motor operating the auxiliary motor by said mechanical connection during the concurrent portion of said strokes.

2. In a hydraulic power transmission system the combination of a main fluid motor and an auxiliary fluid motor, said motors being movable through forward and reverse strokes in the same directions, pump means forming a source of fluid under pressure for operating said motors, means for controlling the supply of fluid to said motors, means forming a separable mechanical connection between said motors, and a control circuit for operating the control means to cause said motors to move through a cycle of non-simultaneous but concurrent forward and reverse strokes, the main motor operating the auxiliary motor by said mechanical connection during the concurrent portion of said strokes and means for by-passing the auxiliary motor during mechanical operation by the main motor.

3. In a hydraulic power transmission system the combination of a main fluid motor and an auxiliary fluid motor, said motors being movable through forward and reverse strokes in the same directions, a pair of pump means forming a source of fluid under pressure for operating said motors, means for controlling the supply of fluid to said motors, means forming a separable mechanical connection between said motors, and a control circuit for operating the control means to cause said motors to move through a cycle of non-simultaneous but concurrent forward and reverse strokes, the main motor operating the auxiliary motor by said mechanical connection during the concurrent portion of said strokes and means for by-passing the auxiliary motor during mechanical operation by the main motor, said control means including a valve for connecting said pumps in parallel, and common means for by-passing the delivery of both pumps while connected in parallel.

4. In a hydraulic power transmission system the combination of a main fluid motor and an auxiliary fluid motor, said motors being movable through forward and reverse strokes in the same directions, a pair of pump means forming a source of fluid under pressure for operating said motors, means for selectively connecting the main motor to one pump for forward or reverse operation or for by-passing the pump, means for selectively connecting the other pump either to the first pump or to a separate delivery line, and means for selectively connecting the delivery line to the auxiliary motor for forward or reverse operation.

5. In a hydraulic power transmission system the combination of a main fluid motor and an auxiliary fluid motor, said motors being movable through forward and reverse strokes in the same directions, a pair of pump means forming a source of fluid under pressure for operating said motors, means for selectively connecting the main motor to one pump for forward or reverse operation or for by-passing the pump, means for selectively connecting the other pump either to the first pump or to a separate delivery line, and means for selectively connecting the delivery line to the auxiliary motor for forward or reverse operation, said last means being also operable to by-pass the auxiliary motor, and means forming a separable mechanical connection for at times driving the auxiliary motor from the main motor.

6. In a broaching machine having a main slide for pulling a broach tool through a work piece and a tool handling slide the combination of a main fluid motor for operating the main slide, an auxiliary motor for operating the tool handling slide, pump means for supplying fluid to operate the motors, means for controlling the supply of fluid to the motors, a control circuit including means for operating the control means to cause the tool handling slide to move toward the main slide and means operable when the tool has engaged the main slide for causing the main slide to move through a broaching stroke and for by-passing the auxiliary motor to permit the tool handling slide to follow the main slide.

7. In a broaching machine having a main slide for pulling a broach tool through a work piece and a tool handling slide the combination of a main fluid motor for operating the main slide, an auxiliary motor for operating the tool handling slide, a main pump for supplying fluid to the main motor, an auxiliary pump for supplying fluid to the auxiliary motor, means for selectively connecting the main pump to either end of the main motor or to exhaust, means for selectively connecting the auxiliary motor to the auxiliary pump for forward or reverse operation or for by-passing the auxiliary motor and means for selectively connecting the two pumps in parallel.

8. In a hydraulic power transmission system the combination of a main fluid motor and an auxiliary fluid motor, said motors being movable through forward and reverse strokes in the same directions, a main pump for supplying fluid to the main motor, an auxiliary pump for supplying fluid to the auxiliary motor, means for selectively connecting the main pump to either end of the main motor or to exhaust, means for selectively connecting the auxiliary motor to the auxiliary pump for forward or reverse operation or for by-passing the auxiliary motor and means for selectively connecting the two pumps in parallel.

HUGH C. NYE.